No. 688,022. Patented Dec. 3, 1901.
W. A. LAIDLAW.
BALE TIE MACHINE.
(Application filed Oct. 2, 1900.)

(No Model.) 10 Sheets—Sheet 1.

Witnesses:
H. C. Rodgers
A. Hooper

Inventor:
Wm. A. Laidlaw
By Fischer & Thorpe
Attys.

No. 688,022. Patented Dec. 3, 1901.
W. A. LAIDLAW.
BALE TIE MACHINE.
(Application filed Oct. 2, 1900.)

(No Model.) 10 Sheets—Sheet 2.

Witnesses:
H. C. Rodgers
A. H. Cooper

Inventor:
Wm. A. Laidlaw
By Fischer & Thorpe
Attys.

No. 688,022. Patented Dec. 3, 1901.
W. A. LAIDLAW.
BALE TIE MACHINE.
(Application filed Oct. 2, 1900.)

(No Model.) 10 Sheets—Sheet 3.

No. 688,022. Patented Dec. 3, 1901.
W. A. LAIDLAW.
BALE TIE MACHINE.
(Application filed Oct. 2, 1900.)

(No Model.) 10 Sheets—Sheet 5.

No. 688,022. Patented Dec. 3, 1901.
W. A. LAIDLAW.
BALE TIE MACHINE.
(Application filed Oct. 2, 1900.)

(No Model.) 10 Sheets—Sheet 6.

Witnesses:
H. E. Rodgers
A. H. Cooper

Inventor:
Wm. A. Laidlaw
By Fischer & Thorpe
Attys.

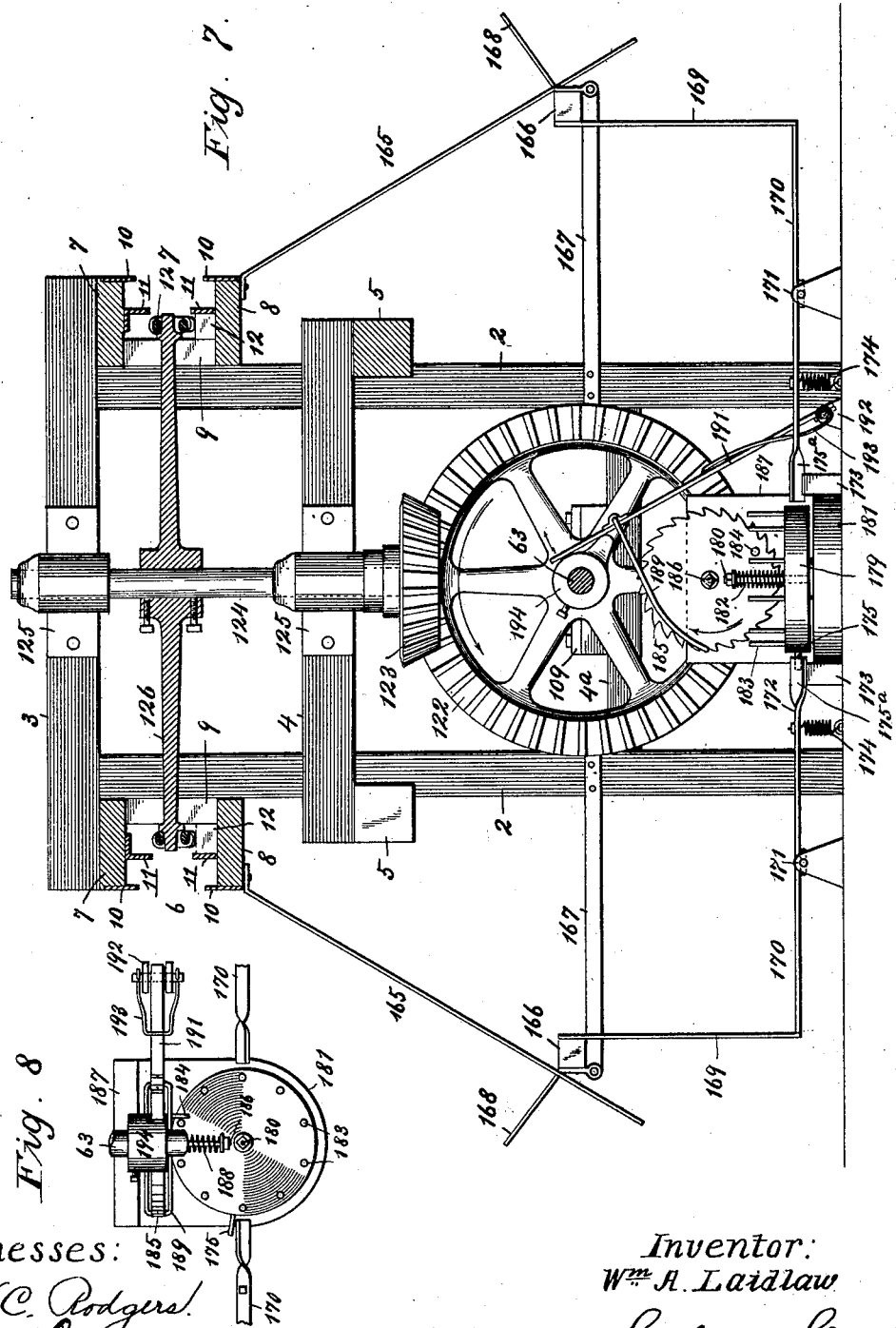

No. 688,022. Patented Dec. 3, 1901.
W. A. LAIDLAW.
BALE TIE MACHINE.
(Application filed Oct. 2, 1900.)
(No Model.) 10 Sheets—Sheet 8.
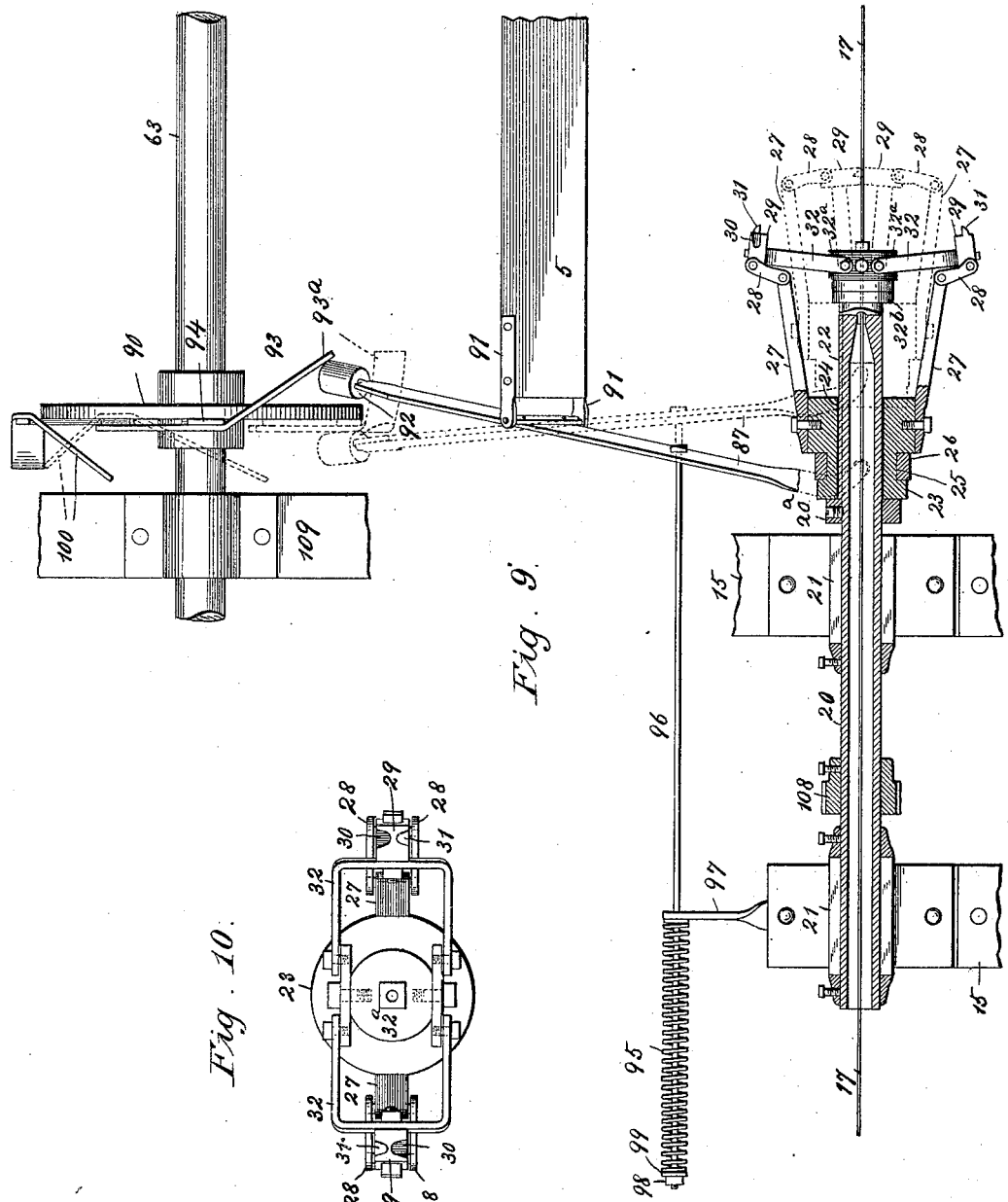
Witnesses:
H. C. Rodgers.
A. H. Cooper.
Inventor:
Wm. A. Laidlaw
By Fischer + Sharpe
Attys.

No. 688,022. Patented Dec. 3, 1901.
W. A. LAIDLAW.
BALE TIE MACHINE.
(Application filed Oct. 2, 1900.)
(No Model.) 10 Sheets—Sheet 9.
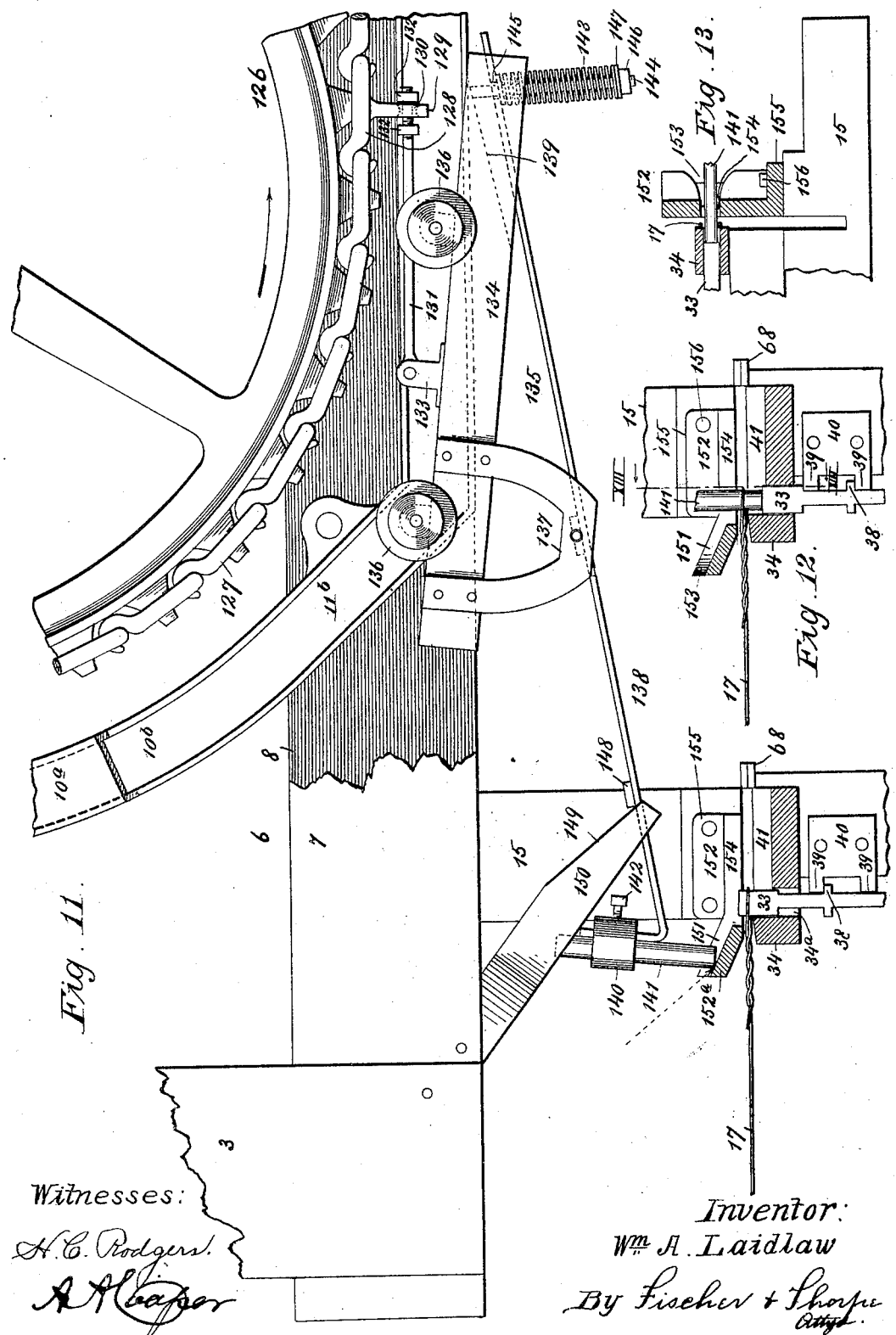
Witnesses:
H. C. Rodgers
A. H. Caper
Inventor:
Wm. A. Laidlaw
By Fischer & Thorpe
Attys.

No. 688,022.  Patented Dec. 3, 1901.
W. A. LAIDLAW.
BALE TIE MACHINE.
(Application filed Oct. 2, 1900.)
(No Model.) 10 Sheets—Sheet 10.
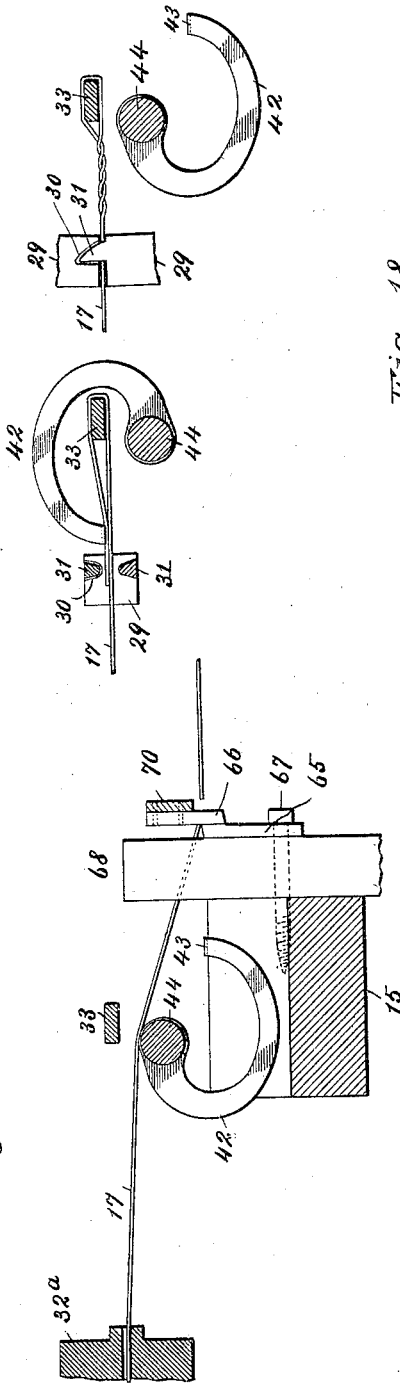
Witnesses:
H. C. Rodgers
A. H. Cooper
Inventor:
Wm. A. Laidlaw
By Fischer & Thorpe
attys.

UNITED STATES PATENT OFFICE.

WILLIAM ALVIN LAIDLAW, OF KANSAS CITY, MISSOURI.

BALE-TIE MACHINE.

SPECIFICATION forming part of Letters Patent No. 688,022, dated December 3, 1901.

Application filed October 2, 1900. Serial No. 31,752. (No model.)

*To all whom it may concern:*

Be it known that I, WILLIAM ALVIN LAIDLAW, a citizen of the United States, residing at Kansas City, Jackson county, Missouri, have invented a new and useful Bale-Tie Machine, of which the following is a specification.

My invention relates to improvements in bale-tie machines; and my object is to construct a machine of this character which will reliably and expeditiously produce perfect bale-ties, count them, and automatically deposit them in bundles of equal number at a convenient point near the machine.

Another object is to so arrange the machine that it may be readily adjusted to produce bale-ties of varying lengths.

It may be further said to consist in the novel arrangement and combination of parts hereinafter described, and pointed out in the claims.

Figure 1:
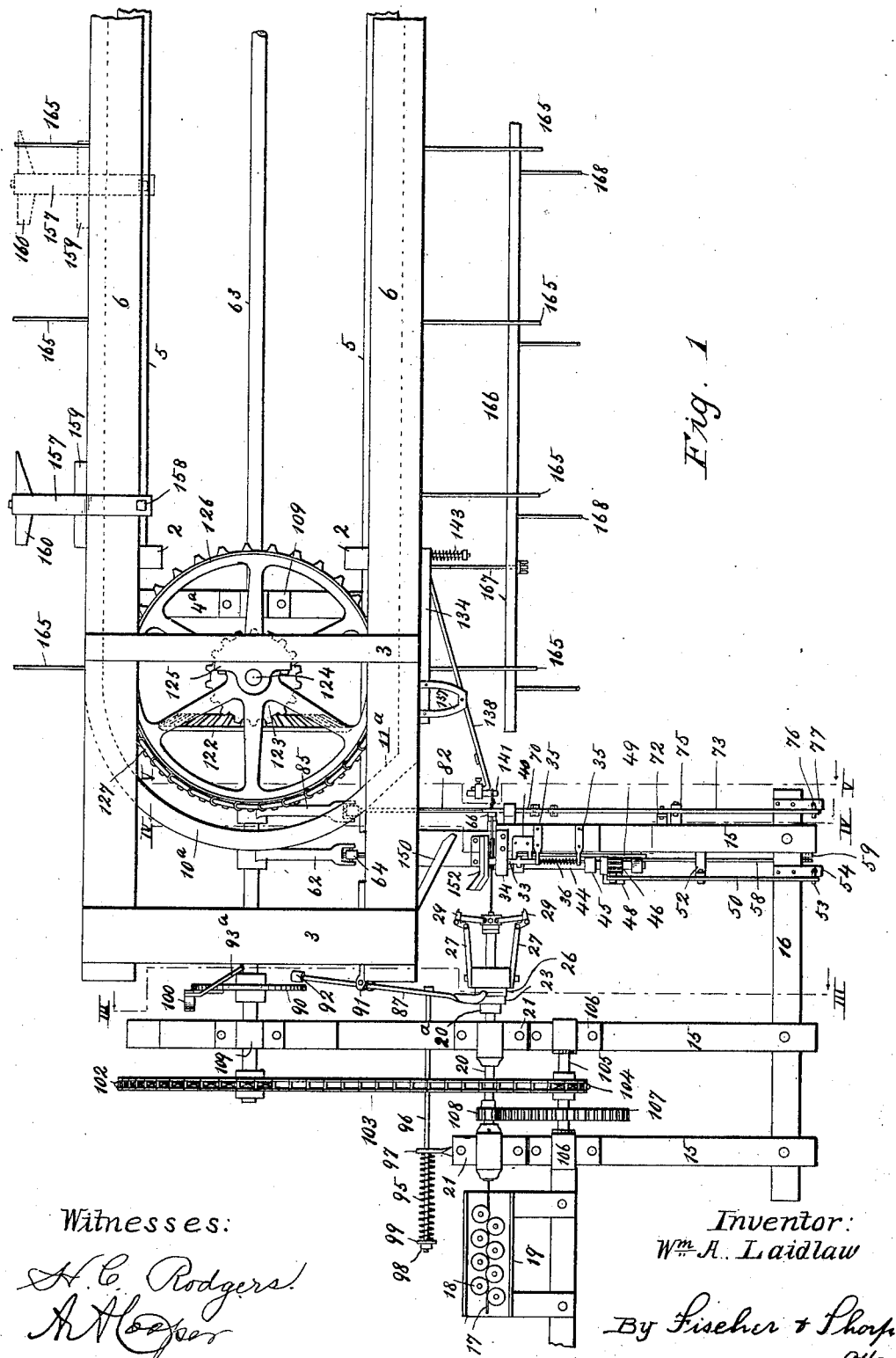
Figure 2:
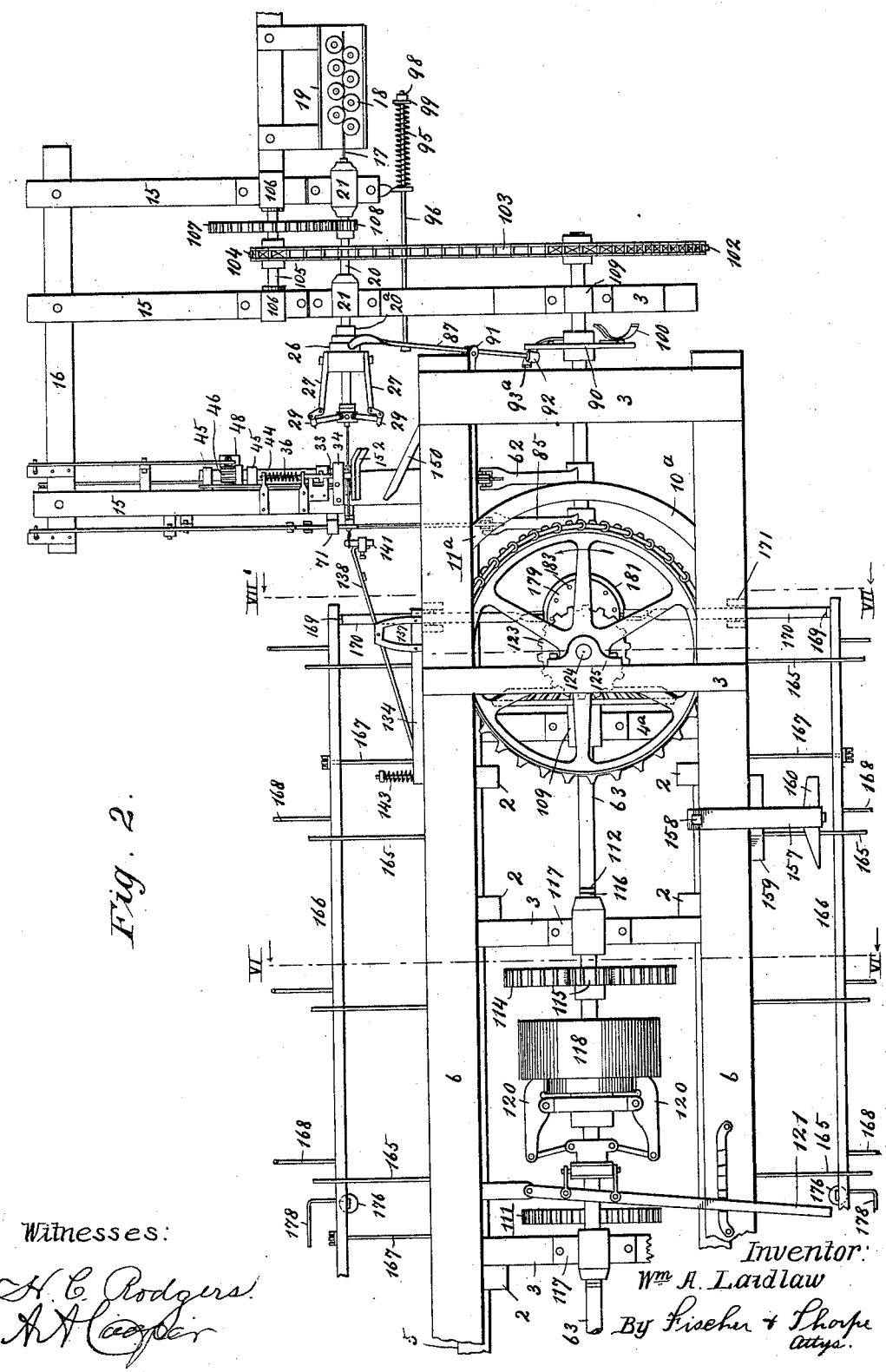
Figure 3:
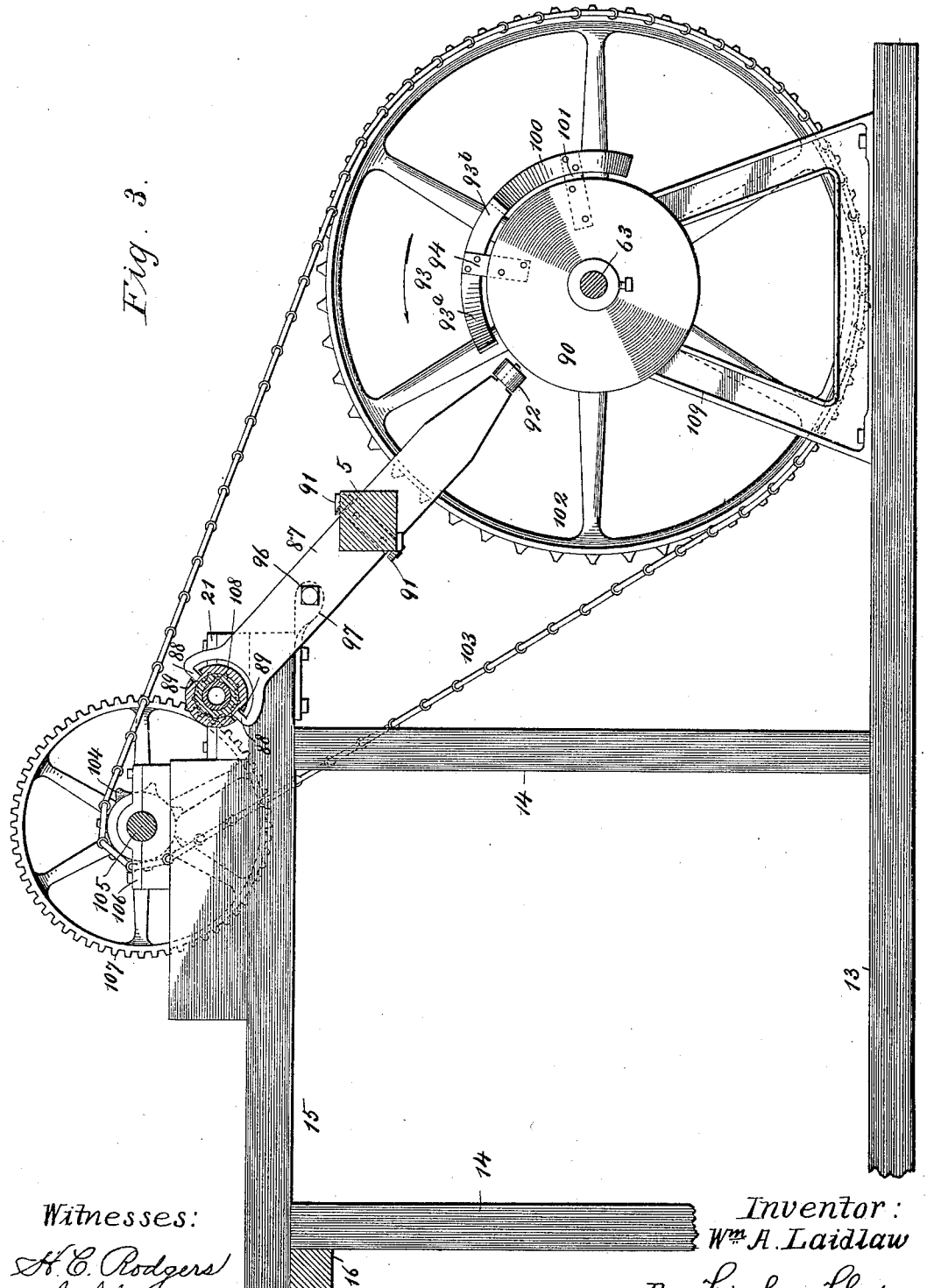
Figure 4:
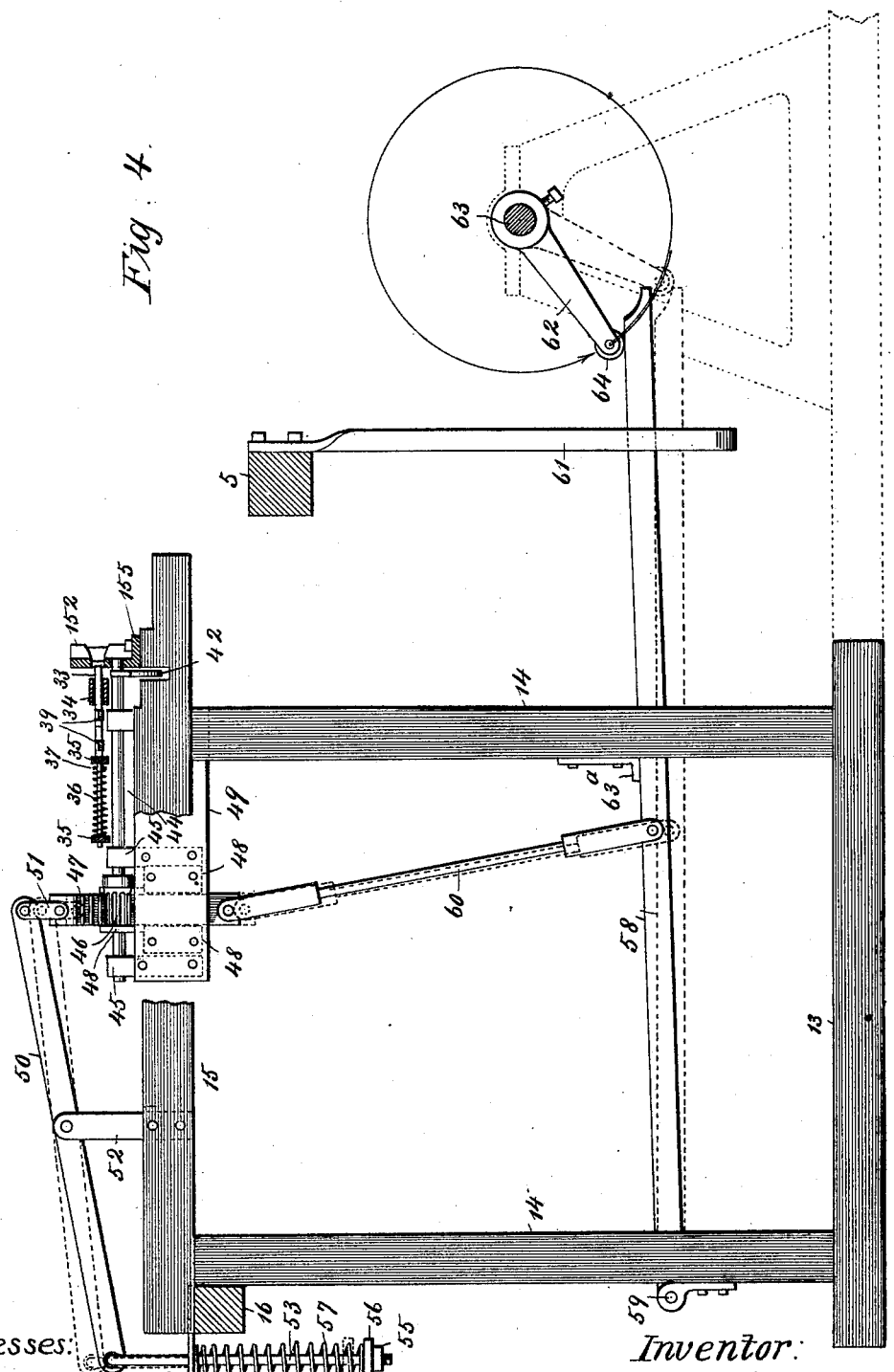
Figure 5:
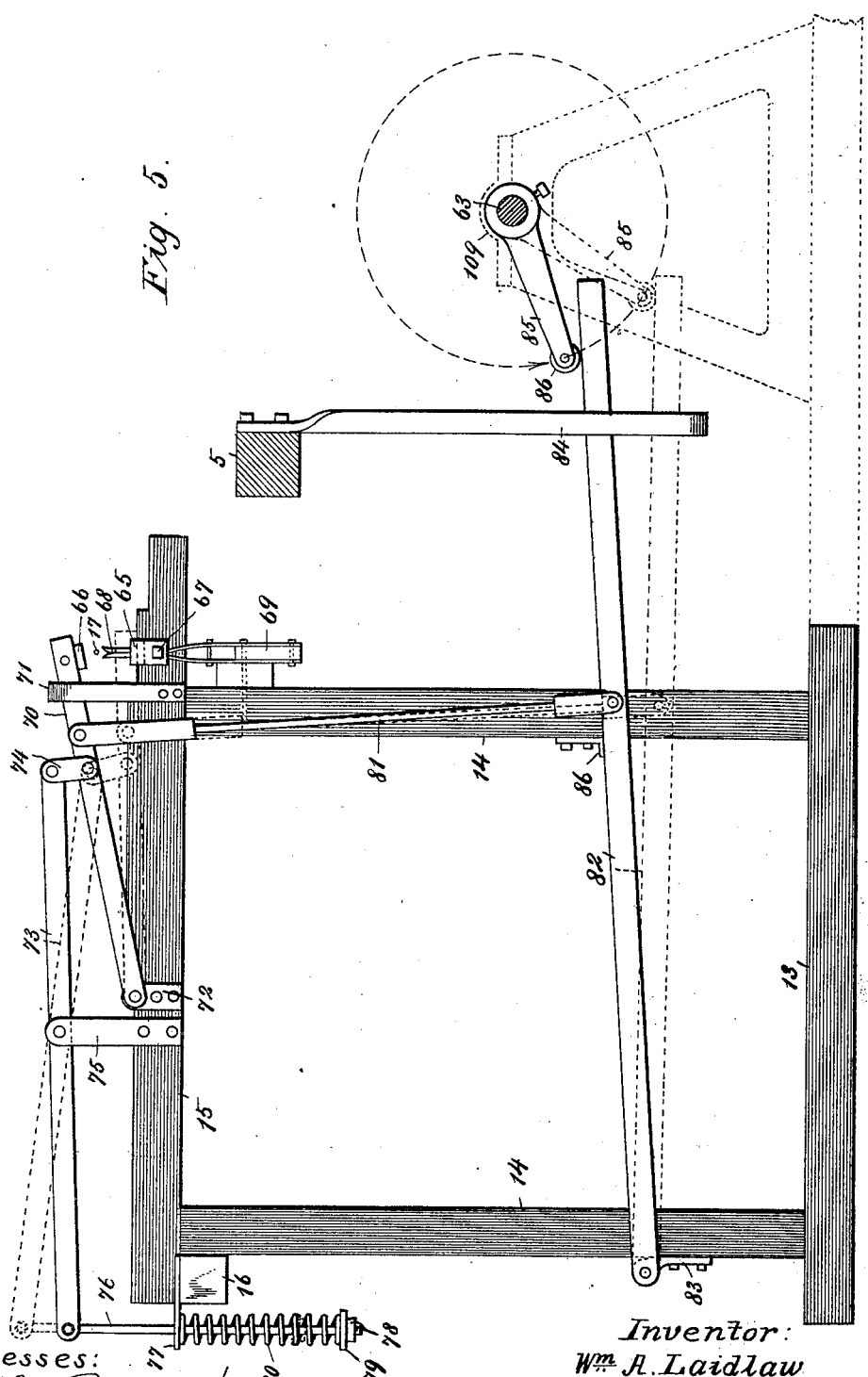
Figure 6:
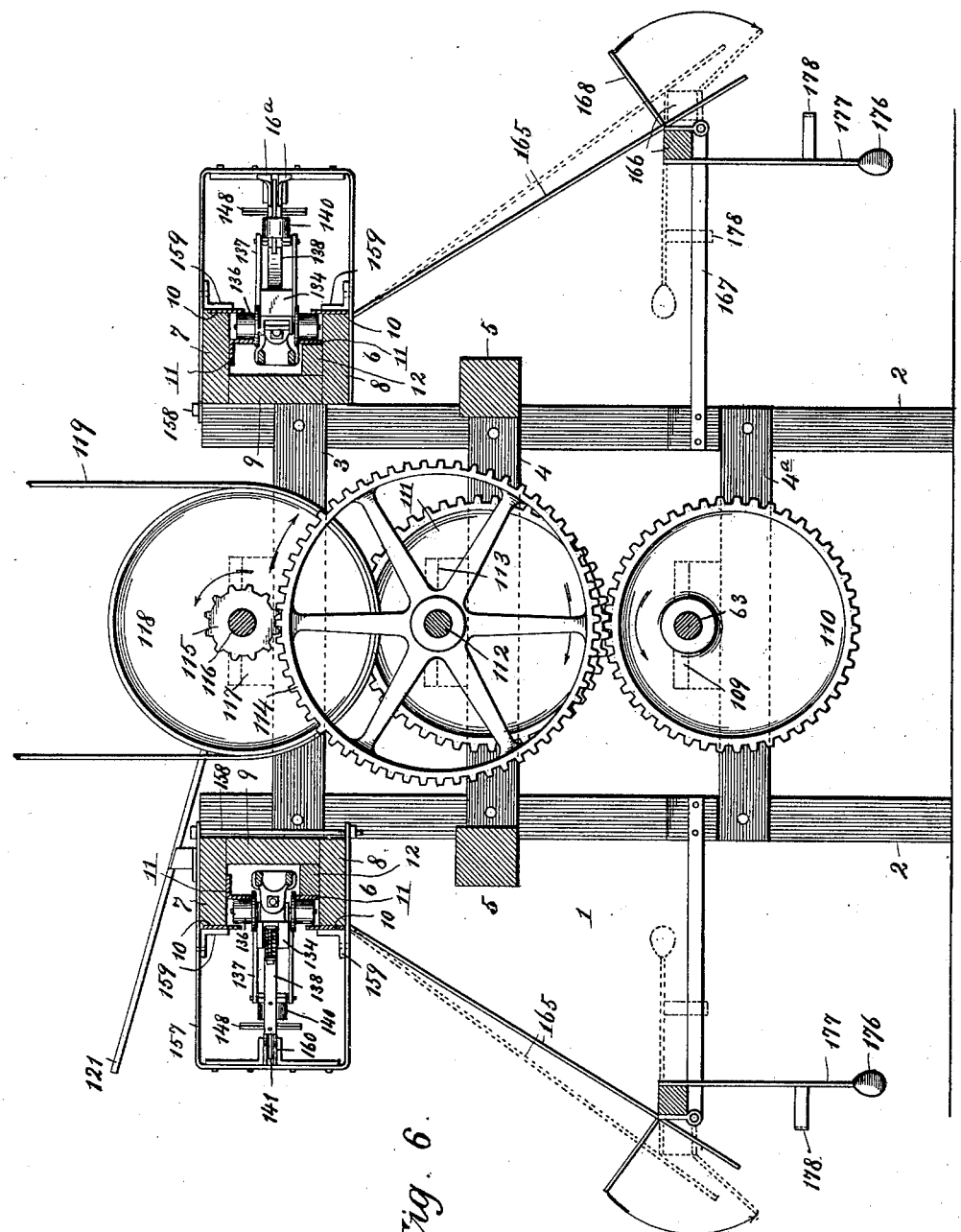

In the drawings which illustrate the invention, Figure 1 represents a plan view of one half of my improved machine. Fig. 2 is a continuation of Fig. 1, representing the other half of the machine. Fig. 3 is a cross-sectional view of the rotary twister and its operating parts, taken on the line III III of Fig. 1. Fig. 4 is a cross-sectional view of the folding mechanism, taken on line IV IV of Fig. 1. Fig. 5 is a cross-sectional view of the knife and its operating parts, taken on line V V of Fig. 1. Fig. 6 is a cross-section of the machine, taken on line VI VI of Fig. 2, showing the variable-speed gearing. Fig. 7 is a cross-section of the machine, taken on line VII VII of Fig. 2, showing the register and the tilting rack. Fig. 8 is a detail plan view of the register. Fig. 9 is a longitudinal section of the rotary twister and its operating mechanism. Fig. 10 is a front elevation of the twister. Fig. 11 is a plan view of the carriage in position to relieve the loop-pin of the looped end of the wire. Fig. 12 is a broken detail view of the loop-bar engaging the looped end of the wire. Fig. 13 is a vertical cross-section taken on line XIII XIII of Fig. 12. Fig. 14 represents a side elevation of the folder ready to bend the severed end of the wire back over the loop-pin. Fig. 15 shows the folder holding the looped end of the wire in position for the rotary twister. Fig. 16 shows the folder down in its first position and the looped and twisted end of wire between the grippers of the rotary twister. Fig. 17 is a plan view showing the loop-bar between the beveled parallel plates provided to release the looped end of the wire therefrom. Fig. 18 shows the wire disengaged from the loop-bar. Fig. 19 is a side elevation of the plates for removing the looped end of the wire from the loop-bar.

In constructing my invention I provide a main frame 1, consisting of vertical supporting-posts 2, braced by upper, intermediate, and lower transverse pieces 3 4 4$^a$ and longitudinal timbers 5. Extending longitudinally of the upper portion of said frame are oppositely-disposed trackways 6, consisting of top and bottom plates 7 8, connected to back plates 9. The face portions of plates 7 8 are provided with rails 10, extending parallel with rails 11, secured to the adjacent sides of plates 7 8, the rails on the latter plates being supported by filling-strips 12. Rails 10 11 are connected at their opposite terminals by curved rails 10$^a$ 10$^b$, terminating at two of their diagonal ends in tangential portions 11$^a$ 11$^b$ for a purpose hereinafter described.

Located diagonally at the opposite ends of the main frame are auxiliary frames comprising transverse foundation-timbers 13, supporting vertical posts 14, secured at their upper ends by transverse and longitudinal timbers 15 and 16, respectively. These frames support the mechanism for straightening, looping, twisting, and cutting the wire, and as the mechanism at one end is a duplicate of that at the opposite end (the machine being arranged to make two bale-ties at the same time) I will for convenience proceed to describe that located at the left-hand terminal of the machine.

One end of a wire 17 is taken from a reel and passed between the customary straightening-rollers 18, journaled on stub-shafts projecting from a plate 19, secured to one end of the auxiliary frame. After leaving the rollers it is passed through a short horizontal tubular shaft 20 and drawn out to a point near a cut-off knife, hereinafter described. Shaft 20 is journaled in bearings 21 and is provided near one end with a feather 22 to rotate a twister comprising a sleeve 23, reciprocally mounted upon the shaft and made to turn therewith through the instrumentality of the feather, which fits into a longitudinal groove 24, arranged in the central bore of the sleeve. Said sleeve is also provided near one end with a peripheral groove 25, in which is loosely mounted a collar 26, having oppositely-located recesses for a purpose hereinafter described. Rigidly secured near the other end of the sleeve are oppositely-disposed diverging arms 27, to the outer terminals of which links 28 are pivotally secured, said links being pivoted at their opposite ends to grips 29, having interlocking grooves 30 and pointed lugs 31 at their opposing ends. The grips are rigidly secured to the outer ends of U-shaped links 32, which are pivotally secured at their inner terminals to the enlarged head portion 32ª of the tubular shaft, which is protected from the impact of the reciprocatory sleeve by a buffer 32ᵇ. After passing through the tubular shaft the wire is drawn under a horizontal loop-pin 33, reciprocally arranged in guides 34 35. The outer portion of the loop-pin is circular in cross-section and provided with an expansion-spring 36, bearing at its opposite ends against one of the guides 35 and a transverse pin 37, extending through the loop-pin. The inner end portion of the loop-pin is rectangular in cross-section and provided with an integral shoulder 38, adapted to contact with either of the shoulders 39 on stop-block 40, and thus limit the movement of said loop-pin. In addition to the aperture 34ª in guide 34 the latter is provided with a facial groove 41, extending from the aperture to its rear end for a purpose hereinafter described.

Located just beneath the loop-pin is an oscillatory folder comprising a curved finger 42, having a groove 43 at its free end for engaging the wire preparatory to bending it back over the loop-pin. Said folder is rigidly secured to the inner terminal of a short horizontal shaft 44, journaled in bearings 45, and carrying near its opposite end a rigidly-mounted pinion 46, meshing with and rotated about a half-revolution by a vertical rack-bar 47, reciprocally arranged in a guide 48. The latter, together with bearings 45, are secured to a supporting-plate 49, bolted to one of the transverse timbers 15.

Rack-bar 47 is normally held in an elevated position by a lever 50, to one end of which it is pivotally connected by links 51. Said lever is fulcrumed near its center to an upright arm 52 and pivotally connected at its opposite end to a vertical rod 53, extending down through a guide 54 and provided with a nut and washer 55 56 at its lower threaded terminal to adjustably retain an expansion-spring 57, encircling the lower portion of the rod and interposed between the guide and washer for the purpose of normally depressing that end of the lever. The rack-bar is drawn on its downward stroke against the action of spring 57 by a lever 58, fulcrumed at its outer end to a bearing 59 and secured to the lower end of the rack-bar by a connecting-bar 60. The free end of said lever extends through a depending guide-loop 61 and is depressed at regular intervals by a radial arm 62, adjustably mounted at one end on a horizontal shaft 63 and provided at its outer terminal with an antifriction-roller 64 to contact with the lever. The upward movement of the lever is limited by a stop 63ª, secured to one of the uprights of the frame.

After the end of the wire has been looped and twisted by the folder and rotary twister it is drawn over a straight-edge 65 the length the bale-tie is to be and then sheared or cut off by a descending knife 66. Said straight-edge is rigidly secured by a lag-screw 67 to the rear side of a vise 68, comprising two spring-jaws, secured at their lower portions to a block 69 and pressing together at their upper portions in order to hold the severed end of the wire, which is forced between them by the knife, in alinement with the folder preparatory to the formation of another loop.

Knife 66 is rigidly secured to the free end of a lever 70, operating through an upright guide-loop 71 and fulcrumed at its opposite end to a bearing 72. Said lever is normally held in a raised position by another lever 73, pivotally connected thereto by links 74 and fulcrumed to an upright arm 75. The rear end of said lever is normally held in a depressed position by a vertical rod 76, extending down through a guide 77 and provided at its lower threaded terminal with a nut and washer 78 79 for adjustably retaining in position an expansion-spring 80, interposed between the guide and washer.

The knife-lever 70 is drawn on its downward stroke by a connecting-bar 81, pivotally secured at its opposite ends to said lever, and a longer lever 82, fulcrumed at its outer terminal to a bearing 83 and extending inwardly through a depending guide-loop 84, terminates in the path of a radial arm 85, adjustably mounted at one end on shaft 63. Radial arm 85, like arm 62, carries at its free end an antifriction-roller 86 for contacting with lever 82 and is set to depress said lever in advance of the depression of lever 58, so the wire will be severed just before it is bent back by the folder. The upward sweep of lever 82 is limited by a stop 86, secured to one of the uprights of the frame. After the end of the wire has been formed into a loop it is immediately seized and twisted by the grippers 29, brought together by a lever 87, which advances sleeve 23 toward the head 32ª, as shown by dotted lines in Fig. 9. Lever 87 is bifurcated at its upper end, which has integral lugs 88 engaging notches 89 in the sleeve, and extending downwardly toward shaft 63 terminates near the periphery of a disk 90, adjustably mounted upon said shaft. It is fulcrumed near its central portion to arms 91, secured to the end of one of longitudinal timbers 5, and carries an antifriction-roller 92 at its lower reduced terminal for contact with an operating-cam 93, secured to the disk by an arm 94. Said cam consists of a front portion 93ª, extending obliquely across the face of the disk for imparting the forward stroke to lever 87, and terminates in a rear portion 93ᵇ, running parallel with the side of the disk for retaining said lever at the end of its stroke until the twister has completed its work, when the lever is released and returned to its former position by an expansion-spring 95, encircling the outer portion of a horizontal rod 96, connected at its inner end to the lever and extending outwardly through a guide 97 terminates in a threaded end provided with a nut and washer 98 99 for adjustably retaining the spring in position thereon.

The backward stroke of lever 87 is limited by the sleeve contacting with a collar 20ª, rigidly secured to the tubular shaft. Should the spring from any cause fail to act, the lever will be returned to its former position by a substantially V-shaped cam 100, secured to the disk in the rear of cam 93 by an arm 101.

In addition to disk 90 shaft 63 is provided with a large rigidly-mounted sprocket-wheel 102, connected by an endless sprocket-chain 103 to a small driven sprocket-wheel 104, rigidly mounted on a counter-shaft 105, journaled in bearings 106. Said counter-shaft also has a cog-wheel 107 rigidly mounted thereon for the purpose of meshing with and driving a smaller cog-wheel 108, rigidly mounted upon tubular shaft 20.

Shaft 63, which I will designate as the "main shaft," is journaled in bearings 109 and driven at a variable speed by an eccentric gear-wheel 110, rigidly mounted thereon and meshing with and driven by another eccentric gear-wheel 111, rigidly mounted on an intermediate shaft 112, journaled at its opposite ends in bearings 113.

Intermediate shaft 112 is driven by a large rigidly-mounted cog-wheel 114, rotated by a pinion 115, rigidly mounted on an upper shaft 116, journaled at its opposite ends in bearings 117 and driven by a clutch-pulley 118, rotated by a driving-belt 119. Pulley 118 is loosely mounted on the shaft, but is made to rotate the latter by a friction-clutch 120, adapted to be thrown in and out of contact with the pulley by means of a lever 121 in the well-known manner.

Shaft 63 is provided near its opposite terminals with rigidly-mounted bevel gear-wheels 122 for the purpose of meshing with and driving smaller bevel gear-wheels 123, rigidly mounted on the lower ends of vertical shafts 124, journaled in bearings 125. Said shafts carry near their upper ends large rigidly-mounted sprocket-wheels 126, connected together by an endless sprocket-chain 127, which travels the greater portion of its distance between plates 7 and filling-strips 12, the latter serving to support the chain where it sags down between the sprocket-wheels. Two oppositely-disposed links 128 of the sprocket-chain are provided with integral lugs 129, having central apertures 130 to receive the terminals of draw-bars 131, loosely retained therein by nuts 132. Said draw-bars are pivotally connected at their opposite ends to fastenings 133, rigidly secured near the central portions of rectangular blocks 134, constituting the body portions of traveling carriages 135, mounted on flanged rollers 136, operating on tracks 10 11, the former being provided to maintain the rollers in position on the latter.

Secured to the rear portion of each carriage-body are brackets 137, between which is pivotally mounted a lever 138, extending obliquely from a recess 139 in the front portion of the carriage backwardly and outwardly a suitable distance beyond the rear thereof, where it is bent to receive a sleeve 140 and a loop-bar 141, the former being provided with a set-screw 142 for securing the latter in position. The front end of lever 138 is held with a yielding pressure in the recess by an expansion-spring 143, encircling a rod 144, projecting outwardly from the carriage through aperture 145 in the lever and provided with a nut 146 and washer 147 for adjustably retaining the spring on the rod. The rear portion of lever 138 is provided with a rigidly-secured vertical contact-bar 148, adapted to slide along the beveled surface 149 of a guide-bar 150, projecting obliquely from the upper corner of the main frame and parallel, or approximately so, with the tangential part of the track to insure the entrance of the outer end of loop-bar 141 into a groove 151 in the side of the angular portion 152ª of a casting 152. The outer end 153 of the groove is made flaring to facilitate the entrance of the loop-bar and continues backwardly to a point near loop-pin 33, where it communicates with a slit 154, extending to the opposite end of the casting. Said casting is provided at its lower portion with an integral flange 155, having apertures to receive bolts 156, by means of which it is secured to the upper portion of the auxiliary frame alongside of guide 34, there being just sufficient space between them to permit the free operation of the folder. The instant the end of the loop-bar enters slit 154 it is forced by spring 143 against the end of the loop-pin, pushing the latter back into recess 34ª, and as the looped end of the wire is too large to enter groove 41 it is transferred by the contacting sides of said groove from the loop-pin to the loop-bar, as shown in Figs. 12 and 13 of the drawings. As the successful performance of this operation requires the carriage to travel at a limited speed, eccentric-gears 110 111 are arranged so the high radius of the former will engage the low radius of the latter at this time, and consequently impart a slow motion to shaft 63. After the loop-bar has secured the wire it draws it out to a releasing device comprising a bracket 157, the opposite ends of which are adjustably secured to plates 7 8 by bolts 158 and angle-irons 159. The vertical portions of said brackets are provided with two rigidly-secured parallel plates 160, having flaring ends 160ª, straight outer sides 161, and beveled inner sides 162, and are arranged with an intervening space 163 of just sufficient width to admit the passage of the loop-bar, which is relieved of the wire by lever 138 contacting with beveled sides 161 of plates 160, which forces the loop-bar back between said plates against the action of spring 143 and delivers the now-completed bale-tie therefrom, as shown by Fig. 18 of the drawings. As the wire has just been previously severed, the bale-tie falls from the loop-bar down upon a rack arranged alongside of the main frame 1. Said rack consists of rods 165, secured to the under side of plate 8, from which they extend down obliquely over a longitudinal bar 166, pivotally secured near its center and opposite terminals to the outer ends of horizontal arms 167, rigidly secured at their opposite ends to the supporting-posts 2 of the main frame.

Bar 166 is provided with rigidly-secured rods 168, extending upwardly at an angle therefrom and forming in conjunction with rods 165 a V-shaped rack to receive the bale-ties. Said rack is prevented from tilting with the bale-ties before the proper number has been received by a vertical arm 169, secured at its upper end to the bar and normally locked at its lower terminal by the outer end of a trip-lever 170, pivotally secured near its central portion to a bearing 171. The opposite end 172 of the trip-lever is held down in contact with a stop-block 173 by a retractile spring 174 in the path of a pin 175 and is twisted to form an inclined surface 175ª, adapted to ride over the pin when the latter is brought in contact therewith. As the pin passes beneath the twisted end of the trip-lever the outer end of the latter is thrown down out of engagement with arm 169, and the rack is tilted to the position shown by dotted lines in Fig. 6 by the weight of the bale-ties therein, the latter being deposited in a bundle on the floor. After the rack is relieved of the weight of the bale-ties it is righted to its former position by a weight 176, attached to the lower end of a depending arm 177. Said arm is also provided with a hook 178, which contacts with one of arms 167, and thus limits the rotation of the rack.

Pin 175 forms part of a register consisting of a horizontal wheel 179, journaled on a vertical shaft 180, projecting upwardly from a base-plate 181 and provided at its upper threaded terminal with a nut and washer for adjusting an expansion-spring 182, encircling the shaft for the purpose of bearing down upon the wheel to prevent it from turning too freely upon its shaft.

Wheel 179 is provided with a predetermined number of equally-spaced vertical pins 183, arranged in a circle adjacent to its periphery, each of which in turn is presented in the path of a pin 184, projecting from the side of a vertical ratchet-wheel 185, journaled on a shaft 186, projecting from a back plate 187, provided at its outer threaded terminal with a nut and washer for retaining thereon an expansion-spring 188 to prevent the ratchet-wheel from turning too freely on its shaft. Said ratchet-wheel is turned one step at a time by a link 189, engaging the ratchet-wheel 195 at its lower end and pivotally connected at its upper end to the upper portion of a lever 191, fulcrumed at its lower end in a bearing 192 and held by a spring 193 in contact with a cam 194, secured to the main shaft 63, and adapted to impart a backward stroke to the lever at each revolution. By employing this register each bundle of bale-ties deposited upon the floor by the rack is known to contain exactly the same number of ties.

The bale-ties may be shortened or lengthened by loosening bolts 158 and setting the releasing device nearer to or farther from the knife and setting the mechanism of the latter, together with the folding and twisting mechanism, to act accordingly.

As hereinbefore mentioned, the mechanism occupying the auxiliary frame at the right-hand terminal of the machine is a duplicate of that at the opposite end, the only change being in the manner in which the knife-lever is connected to lever 82, the change being necessitated by radial arm 85 contacting with lever 82 on its upward sweep instead of on its downward sweep.

Having thus described the invention, what I claim as new, and desire to secure by Letters Patent, is—

1. In a bale-tie machine, a shaft having a central bore, a sleeve reciprocally mounted thereon, a pair of diverging arms rigidly secured at their inner ends to the opposite sides of the sleeve and terminating at their outer ends near the discharge end of the shaft, links pivotally secured at their inner ends to the discharge end of the shaft, grips rigidly secured to the outer portions of said links, and short links pivotally connecting said grips to the outer terminals of the diverging arms, substantially as described.

2. In a bale-tie machine, a tubular shaft, a head formed integral with the discharge end thereof, links pivotally secured at their inner ends to said head, grips rigidly secured to the outer portions of said links, a reciprocating sleeve slidably mounted upon the shaft, a pair of diverging arms rigidly secured at their inner ends to said sleeve, short links connecting the outer ends of said arms to the grippers, and suitable means for imparting the reciprocating movement to the sleeve, substantially as described.

3. In a bale-tie machine, a tubular shaft, a sleeve reciprocally mounted thereon, a pair of diverging arms rigidly secured at their inner ends to said sleeve, U-shaped links pivotally secured at their inner ends to the discharge end of the shaft, grips rigidly secured to the outer portions of said U-shaped links, and short links pivotally connecting the grips to the outer terminals of the diverging arms, substantially as described.

4. In a bale-tie machine, a shaft having a central bore, a head formed integral with the discharge end thereof, U-shaped links pivotally secured at their inner ends to the opposite sides of said head, grips rigidly secured to the outer sides of the links, a reciprocating sleeve loosely mounted upon the shaft, diverging arms rigidly secured at their inner ends to the sleeve, and a plurality of short links connecting the outer terminals of said arms to the grips, substantially as described.

5. In a bale-tie machine, a tubular shaft, a sleeve slidably located thereon, diverging arms rigidly secured at their inner ends to the sides of the sleeve, links pivotally secured at their inner ends to the discharge end of the shaft, grips rigidly secured to the outer portions of said links, interlocking grooves and lugs arranged on the opposing ends of the grips, and short links pivotally connecting said grips to the outer terminals of the diverging arms, substantially as described.

6. In a bale-tie machine, a loop-pin, guides in which it is slidably mounted, an expansion-spring for normally holding it in one position, a shoulder formed integral with the loop-pin, and a stop-block having oppositely-disposed shoulders to limit the movement of the loop-pin, substantially as described.

7. In a bale-tie machine, a loop-pin, guides in which it is reciprocally mounted, a groove in the face portion of one of said guides, and means for limiting the movement of the loop-pin, substantially as described.

8. In a bale-tie machine, a shaft having a central bore adapted to receive a strand of wire, a sleeve reciprocally located thereon, a pair of diverging arms rigidly secured at their inner ends to the opposite sides of the sleeve, and terminating at their outer ends near the discharge end of the shaft, links pivotally secured at their inner ends to the discharge end of the shaft, grips secured to the outer portions of said links, short links pivotally connecting the grips to the outer ends of the diverging arms, a lever pivotally secured near its central portion to the framework and pivotally secured at one end to the sleeve, an antifriction-roller journaled upon the opposite terminal of the lever, a disk suitably mounted, and cams secured to the disk and adapted to engage the roller and oscillate the lever, substantially as described.

9. In a bale-tie machine, a tubular shaft, a sleeve reciprocally mounted thereon, a pair of oppositely-disposed diverging arms secured at their inner ends to the sleeve, and terminating near their outer ends near the discharge end of the shaft, links pivotally secured at their inner ends to the discharge end of the shaft, grips secured to the outer portions of said links, short links pivotally connecting the grips to the outer ends of the diverging arms, a lever pivotally secured near its central portion to the framework and operatively connected at one end to the reciprocatory sleeve, an expansion-spring adapted to retract said end of the lever, and a cam-wheel adapted to force said end of the lever forward against the action of the spring at regular intervals, substantially as described.

10. In a bale-tie machine, a journaled main shaft, a radial arm adjustably mounted thereon, a lever having one end projecting in the path of the radial arm, a folder, a journaled shaft to which it is secured, and suitable connections between the lever and said shaft whereby the latter is operated by the former, substantially as described.

11. In a bale-tie machine, a journaled shaft, a folder secured thereto, a pinion rigidly mounted thereon, a rack-bar meshing with the pinion, a lever for normally holding the rack-bar in a raised position, another lever for depressing the rack-bar, and a radial arm rotatably mounted and adapted to depress the last-mentioned lever, substantially as specified.

12. In a bale-tie machine, a straight-edge, a knife adapted to work in conjunction therewith, a lever to one end of which the knife is secured, a spring for normally holding that end of the lever in a raised position, another lever adapted to depress the first-mentioned one, and a radial arm rotatably mounted and adapted to depress the last-mentioned lever, substantially as described.

13. In a bale-tie machine, an endless track, a carriage mounted thereon, consisting of a body portion, flanged rollers for maintaining the carriage on the track, brackets projecting from one end of the body portion, a lever fulcrumed thereon, and a loop-bar secured to the outer end of the lever, for the purpose set forth and described.

14. In a bale-tie machine, an endless track, a carriage mounted thereon, consisting of a body portion, flanged rollers for maintaining the carriage on the track, brackets projecting from one end of the body portion, a lever fulcrumed thereon, a spring for normally depressing the forward end of the latter, and a loop-bar secured to the opposite end of the lever, substantially as described.

15. In a bale-tie machine, an endless track, an endless cable operating between the rails thereof, gearing for driving the cable, a carriage mounted on the track, and a draw-bar connecting the carriage to the cable, substantially as described.

16. In a bale-tie machine, an endless track, an endless cable operating between the rails thereof, gearing for driving the cable at a variable speed, a carriage mounted on the track, and a suitable connection between the carriage and cable, substantially as described.

17. In a bale-tie machine, an endless track, a carriage mounted thereon, a loop-bar yieldingly secured thereto for engaging the looped end of the wire, and parallel plates secured at a suitable point on the track for disengaging said looped end from the loop-bar, substantially as described.

18. In a bale-tie machine, a tubular shaft, grippers pivotally secured thereto, a sleeve reciprocally mounted upon the shaft, diverging arms for operatively securing the sleeve to the grippers, a lever pivotally secured near its central portion, and pivotally secured at one end to the sleeve, a disk, a cam secured thereon consisting of a front oblique portion and a rear portion parallel with the side of said disk, and another cam of substantially V shape secured to the disk in the rear of the first-mentioned one, substantially as described.

19. In a bale-tie machine, a tubular shaft, grips pivotally secured at one end thereof, a sleeve reciprocally mounted upon the shaft, arms extending from the sleeve, links securing said arms to the grips, a collar rigidly mounted upon the tubular shaft to limit the backward movement of the sleeve, a lever pivotally secured near its central portion and pivotally secured at one end to the sleeve, a disk, radial arms projecting therefrom, a cam secured thereto consisting of an oblique front portion and a rear portion parallel with the side of the disk, and another cam substantially V shape and secured to the arm in the rear of the first-mentioned one, substantially as described.

20. In a bale-tie machine, two parallel tracks connected by curved and tangential end portions, a carriage mounted thereon, a loop-bar yieldingly secured to the carriage, a casting secured near one corner of the track and provided with a groove and communicating slit arranged in the path of the loop-bar, and a guide-bar secured between the casting and tangential portion of the track for the purpose of directing the end of the loop-bar into the groove in said casting, substantially as described.

21. In a bale-tie machine, an endless track, a carriage mounted thereon, a loop-bar yieldingly carried thereby for engaging the looped end of the bale-tie, and two parallel plates adjustably secured to the track in the path of the loop-bar, and provided with beveled sides adapted to withdraw the loop-bar from the looped end of the bale-tie, substantially as described.

22. In a bale-tie machine, two oppositely-disposed vertical shafts suitably journaled, sprocket-wheels keyed to the upper portions thereof, an endless chain connecting the same together, bevel gear-wheels keyed to the lower terminals of the shafts, a horizontal main shaft suitably journaled, two beveled gear-wheels keyed thereon and meshing with the first-mentioned ones, an eccentric gear-wheel also keyed upon the main shaft, another shaft journaled above the main shaft, an eccentric gear-wheel keyed thereon and meshing with the one on the main shaft, and suitable means for driving the upper shaft, substantially as described.

23. In a bale-tie machine, a loop-pin reciprocally mounted, a folder adapted to bend the wire back over the loop-pin, a rotary twister for twisting the looped end of the wire, a loop-bar adapted to relieve the loop-pin of the looped end of the wire, and a cut-off knife for severing the wire, substantially as described.

24. In a bale-tie machine, a journaled shaft, a folder secured thereto, a pinion rigidly mounted thereon, a rack-bar meshing with the pinion, a lever for normally holding the rack-bar in a raised position, an expansion-spring for normally depressing the opposite end of said lever, another lever for depressing the rack-bar against the action of the expansion-spring, and a radial arm rotatably mounted and adapted to depress the last-mentioned lever, substantially as described.

25. In a bale-tie machine, a rack pivotally mounted thereon, a depending arm secured to the rack, a lever engaging the lower end thereof, a register adapted to disengage the lever from the depending arm so the rack may tilt with the bale-ties, and a weight secured to the rack to return it to its former position, substantially as described.

26. In a bale-tie machine, a register consisting of a vertically-mounted ratchet-wheel, a link adapted to engage the teeth thereon, a lever to which the opposite end of the link is pivotally secured, a cam adapted to impart a stroke to the lever at each revolution, a pin secured to one side of the ratchet-wheel, a horizontal wheel journaled near the ratchet-wheel, vertical pins projecting from the upper side thereof, one of which is always in the path of the pin on the ratchet-wheel, a pin projecting from the face of the horizontal wheel, a lever having one end arranged in the path of said pin, and a tilting rack held in its normal position by the opposite end of the lever, for the purpose set forth and described.

27. In a bale-tie machine, a loop-pin reciprocally mounted, a folder adapted to bend the wire back over the loop-pin, a rotary twister for twisting the looped end of the wire, a loop-bar for relieving the loop-pin of the looped end of the wire, a knife for severing the wire, and a vise adapted to hold the severed end of the wire in alinement with the folder, substantially as described.

28. In a bale-tie machine, a loop-pin, a folder for bending the wire over the loop-pin, means for twisting the looped end of the wire, a loop-bar adapted to take the looped end of the wire from the loop-pin, a knife for severing the wire, and a vise consisting of spring-jaws which hold the severed end of the wire in alinement with the folder, substantially as described.

29. In a bale-tie machine, a reciprocatory loop-pin, means for forming the end of the wire in a loop around said loop-pin, a loop-bar, one end of which is adapted to contact with and press back the loop-pin, and a guide having a facial groove which transfers the looped end of the wire from the loop-pin to the loop-bar, substantially as described.

30. In a bale-tie machine, a reciprocatory loop-pin, means for looping the wire around the same, a loop-bar adapted to contact with the end of the loop-pin and relieve it of the looped end of the wire, and a grooved casting adapted to guide the end of the loop-bar against the opposing terminal of the loop-pin, substantially as described.

31. In a bale-tie machine, a reciprocatory loop-pin, means for looping the wire around the same, a traveling loop-bar adapted to contact with the end of the loop-pin, and relieve the latter of the looped end of the wire, and means for automatically reducing the speed of the traveling loop-bar while performing said operation, substantially as described.

32. In a bale-tie machine, a reciprocatory loop-pin, means for looping the wire around the same, a loop-bar adapted to contact with the end of the loop-pin and relieve it of the wire, a grooved and slitted casting adapted to guide the loop-bar against the opposing end of the loop-pin, and a guide-bar adapted to guide the end of the loop-bar into the grooved end of said casting, substantially as described.

33. In a bale-tie machine, a reciprocatory loop-pin, means for looping the wire around the same, two parallel rails, curved and tangential end portions which connect the opposite terminals of said rails, a loop-bar adapted to travel around said rails, a grooved and slitted casting for guiding the end of the loop-bar against the opposing terminal of the loop-pin, and guide-bars arranged substantially parallel with the tangential portions of the rails, for the purpose set forth and described.

34. In a bale-tie machine, suitable means for forming a loop on one end of the wire, a carriage, a loop-bar yieldingly secured thereto for engaging the looped end of the wire, a knife for severing the wire, and parallel plates adapted to disengage the bale-tie from the loop-bar, substantially as described.

35. In a bale-tie machine, a loop-pin, a guide having an aperture to receive one end of the loop-pin, and a facial groove extending from the aperture to the opposite end of the guide, means for looping one end of the wire around the loop-pin, a carriage, a loop-bar yieldingly secured thereto, a casting arranged parallel with the guide, a groove and communicating slit arranged therein in the path of the loop-bar, to guide the end of the latter against the opposing end of the loop-pin, for the purpose set forth and described.

36. In a bale-tie machine, a straight-edge, a knife adapted to work in conjunction therewith, a lever to one end of which the knife is secured, a spring for normally holding that end of the lever in an elevated position, another lever adapted to depress the first-mentioned one, an arm adapted to depress the last-mentioned lever, and a guide for holding the end of the lever in the path of the arm, substantially as described.

37. In a bale-tie machine, a straight-edge, a knife for working in conjunction therewith, a lever to one end of which the knife is secured, a spring for normally holding that end of the lever in an elevated position, a radial arm for depressing the lever against the action of the spring, and an antifriction-roller journaled in the outer end of said arm, for the purpose set forth and described.

38. In a bale-tie machine, a knife for severing the wire, a lever to one end of which it is secured, a spring to normally hold that end of the lever in a raised position, a stop to limit the upward stroke of the lever, and a radial arm to depress the lever, substantially as shown and described.

39. In a bale-tie machine, a track, a carriage mounted thereon, a lever fulcrumed to the carriage, and a loop-bar adjustably secured to the outer terminal of the lever, substantially as described.

40. In a bale-tie machine, a track, a carriage mounted thereon, a lever fulcrumed to the carriage, a spring for normally holding one end of the lever against the carriage, a loop-bar secured to the opposite terminal of the lever, and a contact-bar also secured to the lever, for the purpose set forth and described.

41. In a bale-tie machine, a traveling loop-bar arranged to carry the looped end of the bale-tie, two plates adjustably secured to the machine, and beveled sides upon said plates adapted to disengage the bale-tie from the loop-bar, substantially as described.

42. In a bale-tie machine, a traveling loop-bar arranged to carry the looped end of the bale-tie, two plates adjustably secured to the machine, flaring ends on the plates to facilitate the entrance of the loop-bar in the space formed between them, and beveled sides upon said plates to disengage the bale-tie from the loop-bar, substantially as described.

43. In a bale-tie machine, horizontal arms projecting therefrom, a rack pivotally mounted upon the outer terminals thereof, a depending arm secured to the rack, a lever engaging the lower end of the arm, a register adapted to disengage the lever from the depending arm so the rack may tilt with the bale-ties, a hook attached to the arm to limit the tilting movement of the rack, and a counterbalance-weight adapted to return the rack to its normal position substantially as described.

In testimony whereof I affix my signature in the presence of two witnesses.

WILLIAM ALVIN LAIDLAW.

Witnesses:
I. H. C. RODGERS,
F. G. FISCHER.